June 23, 1931.  K. L. HANSEN  1,811,668
DYNAMO ELECTRIC MACHINE
Filed April 9, 1928   3 Sheets-Sheet 1

Inventor:
Klaus L. Hansen

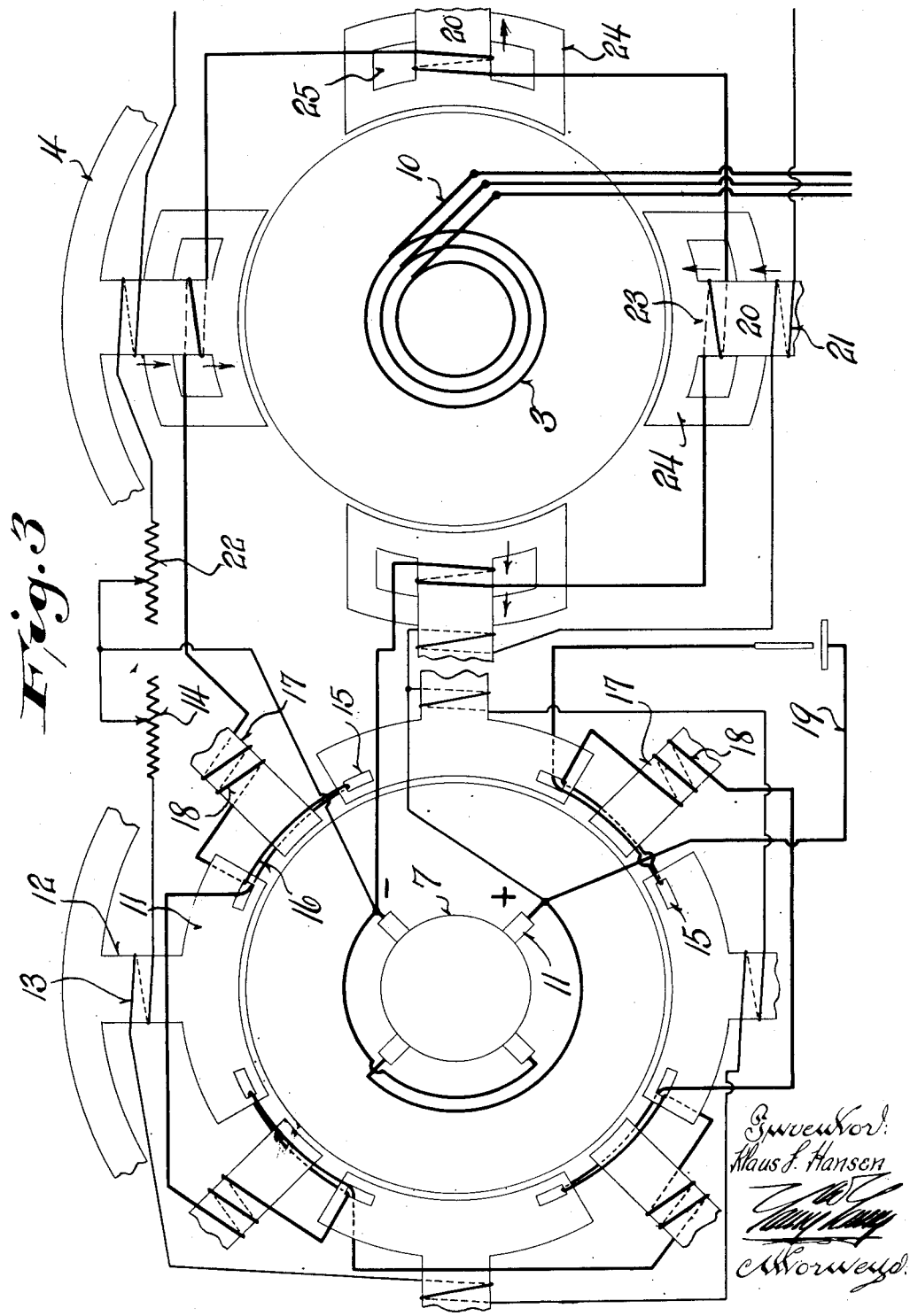

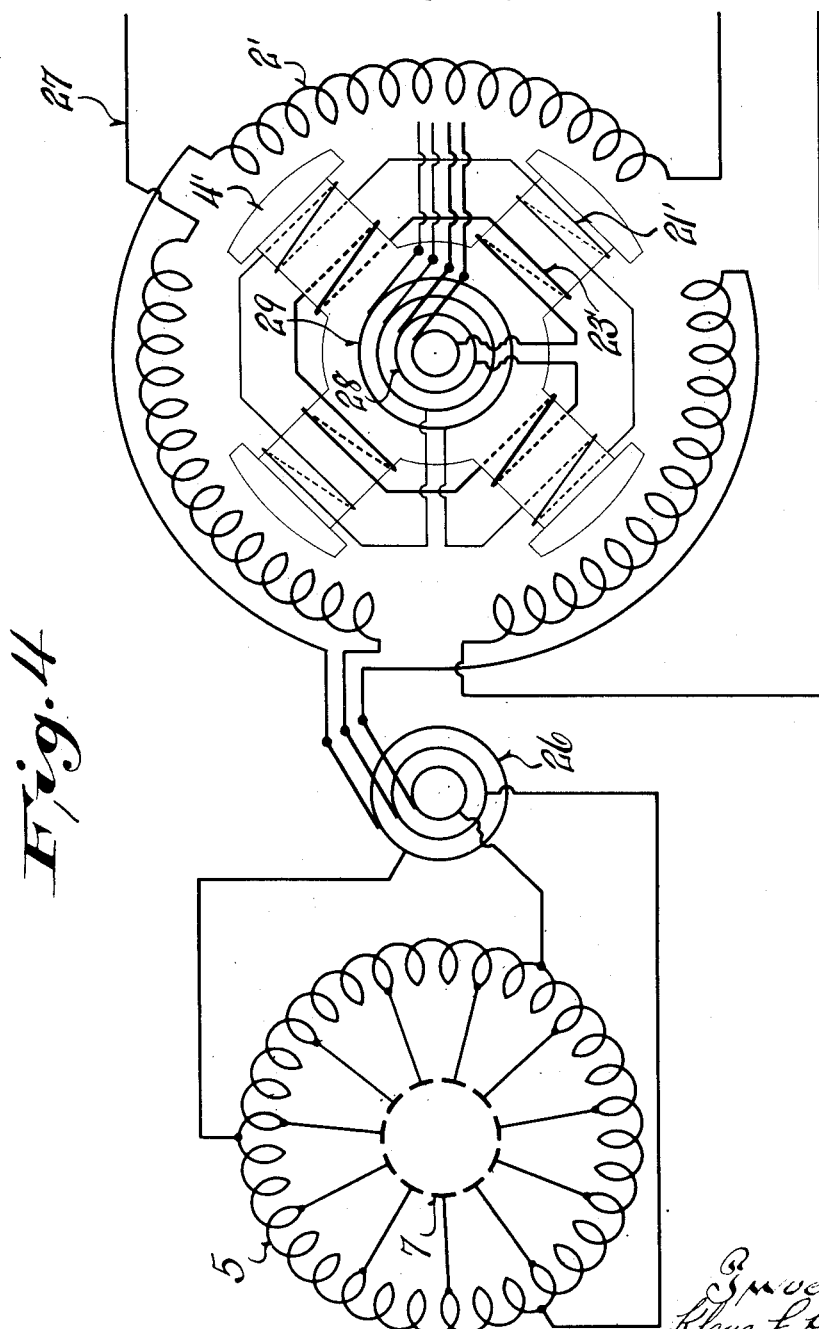

Patented June 23, 1931

1,811,668

UNITED STATES PATENT OFFICE

KLAUS L. HANSEN, OF MILWAUKEE, WISCONSIN

DYNAMO ELECTRIC MACHINE

Application filed April 9, 1928. Serial No. 268,688.

This invention relates to dynamo electric machines and is particularly directed to a machine adapted to convert electrical energy from A. C. to D. C.

Various methods have been employed for effecting this conversion and they may be roughly grouped as a synchronous converter, a dynamotor, a motor generator, and a motor-converter.

While a synchronous converter has a low first cost, high efficiency, and low resistance loss, it nevertheless has an approximately fixed ratio of A. C. voltage to D. C. voltage. Even if the D. C. voltage is varied through a small range, the power factor is varied, which is obviously a disadvantage.

With a dynamotor, two distinct windings on the armature are required and this not only adds to the cost of manufacture, but increases the resistance loss.

Further, the D. C. voltage can be varied only through a limited range and when so varied, alters the power factor.

While the D. C. voltage may be controlled with a motor generator set, there is a relatively high loss, due to the fact that two distinct machines are employed and also the initial expense is considerably higher than with the other types of machines mentioned.

The motor converter, or as it is sometimes called, the cascade-converter, is a two-machine structure. One of the machines consists of a stator similar to the stator of an induction motor and cooperating with a wound rotor, the stator being the primary and the rotor being the secondary. The other machine has a stationary D. C. field structure cooperating with a rotor which is constructed in a manner identically similar to the armature of a rotary converter, such rotor being the primary with reference to the incoming A. C. energy supply. The frequency of the alternating current supplied the rotor of the second machine is always less than line frequency.

The motor-converter shares with the dynamotor the lack of flexibility in varying the D. C. voltage without disturbing the power factor at the A. C. terminals.

In many cases, it is desirable to have a variable D. C. voltage, as for example, in the Ward-Leonard system, arc welding, and other applications.

This invention is designed to overcome the defects of the machines as noted above and objects of this invention are to provide a machine for converting electrical energy from A. C. to D. C. in a novel manner to secure the advantages of both the synchronous converter and the motor generator, while avoiding their disadvantages.

More specifically, objects of this invention are to provide a novel form of dynamo electric machine which has a synchronous motor combined with a direct current machine with the windings of the two primaries interconnected in such a manner that both the converter action and the direct current dynamo action takes place, and are jointly effective in producing the terminal D. C. voltage, and in which the frequency impressed upon the rotor of the D. C. machine is the line frequency.

Further objects are to provide a machine having the characteristics enumerated immediately above in which the power factor may be controlled and may be made leading, lagging, and of any value desired, and also in which the D. C. voltage may be varied throughout any desired range.

Further objects are to provide a dynamo electric machine which is suitable for any system where a variable voltage is desired, and which is particularly suitable for arc welding as its characteristics, which may be controlled, are such that any desired open circuit voltage may be obtained and also a predetermined short circuit current may be obtained.

Further objects are to provide a dynamo electric machine which has a relatively low initial cost, which has a very small resistance loss, which has a high efficiency, which is most easily controlled and which is so constructed that a very large reactance is produced in the D. C. circuit due to the construction of the dynamo electric machine itself and without the use of any auxiliary reactance.

Embodiments of the invention are shown in the accompanying drawings in which:

Figure 3 is a diagrammatic view showing the connections of the field structure of the two machines and the supply and work circuits.

Figure 4 is a diagrammatic view showing a further modification.

Figure 1:
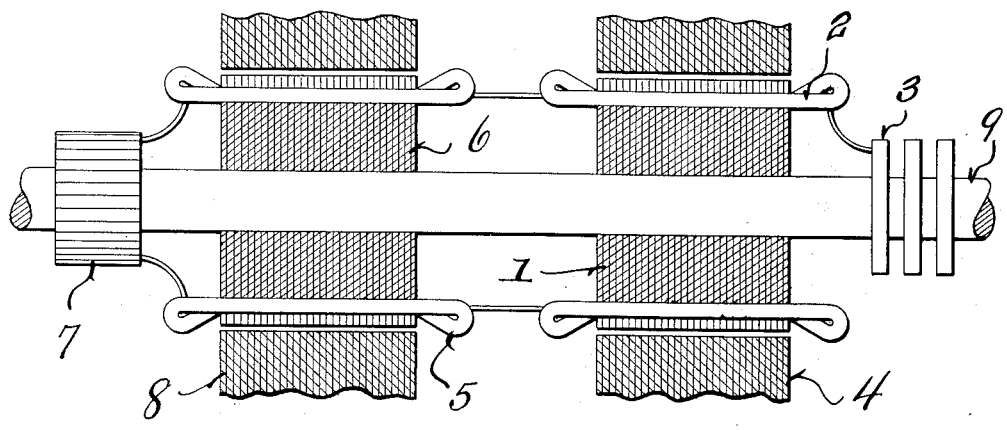
Figure 1 is a fragmentary view showing the rotors of the synchronous motor and direct current dynamo.

Referring to the drawings, it will be seen that the machine comprises a synchronous motor having a wound rotor 1 whose windings 2 are connected to slip rings 3. The rotor cooperates with the stator 4, a portion of which is shown in Figure 1. The alternating current windings 2 of the synchronous motor are connected to the windings 5 of the rotor or armature 6 of the direct current dynamo, and the windings 5 of this rotor are connected to the commutator 7. A portion of the field structure 8 of the direct current dynamo is shown in Figure 1. It is to be noted particularly that these two rotors are carried by the same shaft 9, and thus the rotors operate as a unit.

Figure 2:
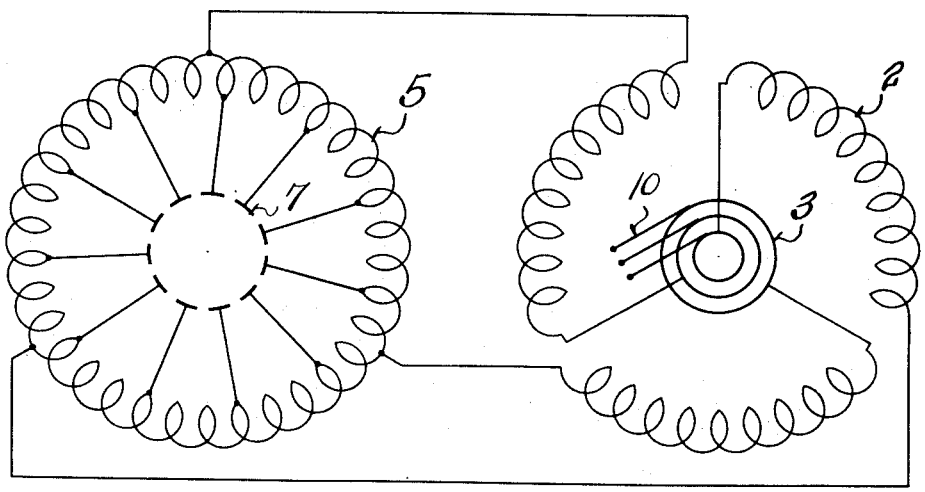
Figure 2 is a diagrammatic view showing the manner in which the windings of the rotors of the two machines are connected.

Referring to Figure 2, it will be seen that the windings 2 of the rotor of the synchronous motor, are shown as supplied with three phase current. These windings are connected at one end to the slip rings 3 and at the other end to electrically equidistant points of the windings 5 of the direct current dynamo. Thus, the alternating current supply is fed to the slip rings 3 of the rotor of the synchronous motor by means of the brushes 10. The direct current is taken from the commutator 7 of the dynamo by means of the brushes 11 (see Fig. 3). The brushes in the direct current dynamo correspond to the number of poles of the field of the dynamo and are connected in pairs, as shown.

From the description thus far given, it will be seen that the line frequency is directly impressed on the winding of the rotor of the direct current dynamo. Further, it will be seen that the winding of the direct current dynamo rotor is connected through the winding of the synchronous motor directly to the alternating current supply.

The field structure for the dynamo electric machine may comprise a plurality of poles which have relatively wide pole faces 11 as compared with the necks or cores 12 of the poles. The cores 12 are wound as indicated at 13, and these windings are connected across the brushes 11 of the dynamo through a rheostat 14. The wide field poles 11 are provided with slots 15 which receive the reactance increasing winding 16. This winding may also continue around the interpoles 17. The construction is similar to that disclosed in my prior Patent No. 1,418,707 of June 6, 1922, for constant current generator for arc welding.

The reactance increasing winding 16 may, however, be used without the windings 18 on the interpoles 17 as these reactance increasing windings enclose the interpoles and consequently may be so designed as to set up the necessary flux.

The reactance increasing winding 16 is connected in series with the work circuit 19 which, as shown in the drawings, is a welding circuit, although as previously stated, the machine is adapted for use in other capacities.

The field structure 4 of the synchronous motor comprises a plurality of poles 20 which are energized by means of the direct current windings 21. These windings are connected across the brushes of the direct current dynamo and the value of the current and consequently the strength of the field of the synchronous motor, may be controlled by means of the rheostat 22.

The poles 20 of the synchronous motor are also provided with the series winding 23 which is connected in series with the reactance increasing winding 16 and the work circuit 19. The windings 23 and 21 are cumulative in their effect.

The poles 20 of the synchronous motor may be formed as shown in Figure 3 with the additional portions 24 providing the openings 25 for the reception of the series windings 23. This also increases the reactance of this series circuit and adds its effect to that produced by the reactance increasing winding 16 of the dynamo.

It is apparent that if the effect on the dynamo is not desired, the reactance increasing winding 23 of the synchronous motor may alone be employed, although it is preferable to use the reactance increasing winding 16 of the dynamo. Also, this winding has the additional effect of distorting the flux distribution in the pole faces 11, and consequently of controlling the short circuit current. It is also apparent that the portions 24 of the synchronous motor field structure, may be omitted, if desired. In this case, the reactance increasing winding 16 of the dynamo would be made sufficient to furnish the requisite inductance for the work circuit.

From the description of the dynamo electric machine, it is apparent that the direct current winding of the rotor of the dynamo is connected through the alternating current winding of the primary of the synchronous motor directly to the alternating supply mains. Thus, the machine has both the characteristics of a rotary converter and of a dynamo. The voltage opposing the line voltage is made up of the vector sum of the voltage in the rotor winding of the dynamo and the voltage in the alternating current winding of the synchronous motor.

It is apparent that the open circuit voltage of the dynamo can be very readily controlled by adjusting the rheostats 14 and 22. If desired, these rheostats may be omitted and the machine designed for the particular conditions under which it is to be used, although it is preferable to employ these rheostats. Further, it is apparent that the power factor may be readily controlled by means of the rheostats and that this power factor may be made leading, lagging, and of any value desired.

It is also apparent that as the current in the work circuit increases that the distortion of the flux in the dynamo pole faces increases and also that the strength of the field of the synchronous motor increases. All of these changes jointly have the effect of decreasing the voltage supplied the work circuit and consequently the dynamo electric machine is automatic in its regulation, and may be designed for any given short circuit current. Further, it is obvious that the brushes on the dynamo may be shifted to further predetermine the short circuit current.

In the form of the invention shown in Figure 4, the same idea is employed as that previously set forth. However, with very large machines, it may be desirable to put one or more bearings between the dynamo and the synchronous motor. In this case, difficulty may be experienced in directly connecting the windings and consequently it is desirable to provide a construction which will accommodate these changes. This has been done, as shown in Figure 4, without departing from the spirit of the invention. In this case, the dynamo rotor and the field or rotor of the synchronous motor are directly connected by mounting them rigidly upon the same shaft, or upon coupled shafts, as previously described. However, the winding 5 of the dynamo rotor is connected at electrically equidistance points to slip rings 26 which are in turn connected to the stator windings 2' of the synchronous motor, such windings corresponding to the windings 2 in the form previously described, except that they are carried by the stator. These windings are directly connected to the incoming alternating current supply mains 27.

The field structure 4' of the synchronous motor is rotating, as previously described, and is provided with the shunt winding 21' and the series winding 23' corresponding to the windings 21 and 23 in the form previously described. The windings 21' and 23' are connected in identically the same manner as previously described, through the medium of two pair of slip rings indicated by the reference characters 28 and 29. The function or operation of this machine is identically similar to that previously described and need not therefore be further developed.

It will be seen that a novel form of dynamo electric machine has been provided which is adapted to furnish a variable voltage in a novel and effective manner, suitable for use in a number of situations, such as the Ward-Leonard system, in arc welding systems, and other applications.

Further, it will be seen that a synchronous motor combined with a direct current dynamo has been disclosed by this invention, in which line frequency is impressed upon the windings of the rotor of the dynamo.

Further, it will be seen that the windings of the rotor of the dynamo are directly connected through the primary of the synchronous motor to the alternating current supply mains.

It will be seen further that the dynamo electric machine has a very low resistance loss, has a high efficiency, and is most easily controlled.

Although the invention has been described in considerable detail, such description is intended as illustrative rather than limiting as the invention may be variously embodied and as the scope of such invention is to be determined as claimed.

I claim:

1. The combination of a direct current dynamo and a separate and distinct synchronous motor, said dynamo supplying the current for energizing its field, a work circuit connected to said dynamo, said dynamo having a series commutating winding, said motor having a series field winding, and means for producing a large leakage flux interlinking at least one of said series windings, whereby a highly reactive load circuit is produced.

2. The combination of a direct current dynamo and a separate and distinct synchronous motor, said dynamo supplying the current for energizing its field, a work circuit connected to said dynamo, said dynamo having a series commutating winding, said motor having a series field winding, and means for producing a large leakage flux interlinking the said series field winding of said synchronous motor, whereby a highly reactive load circuit is provided.

3. The combination of a direct current dynamo having a rotor provided with a winding and a separate and distinct synchronous motor having a rotor provided with a winding, said dynamo supplying the current for energizing its field, the windings of said rotors being interconnected, a work circuit connected to said dynamo, said dynamo having a series commutating winding, said motor having a series field winding, and means for producing a large leakage flux interlinking at least one of said series windings, whereby a highly reactive load circuit is produced.

4. The combination or a direct current dynamo having a rotor provided with a winding and a separate and distinct synchronous motor having a rotor provided with a winding, said dynamo supplying the current for energizing its field, the windings of said rotors being interconnected, a work circuit connected to said dynamo, said dynamo having a series commutating winding, said motor having a series field winding, and means for producing a large leakage flux interlinking the said series field winding of said synchronous motor, whereby a highly reactive load circuit is provided.

In testimony that I claim the foregoing I have hereunto set my hand at Milwaukee, in the county of Milwaukee and State of Wisconsin.

KLAUS L. HANSEN.